United States Patent [19]

Hayashi

[11] Patent Number: 4,618,022
[45] Date of Patent: Oct. 21, 1986

[54] POWER TRANSFER DEVICE FOR FOUR-WHEEL DRIVE VEHICLE

[75] Inventor: Hideyuki Hayashi, Toyota, Japan

[73] Assignee: Toyota Jidosha Kabushiki Kaisha, Japan

[21] Appl. No.: 818,688

[22] Filed: Jan. 14, 1986

[30] Foreign Application Priority Data

Jan. 16, 1985 [JP] Japan ................................. 60-5399

[51] Int. Cl.$^4$ ......................... B60K 5/04; B60K 17/34
[52] U.S. Cl. ................................ 180/249; 180/233; 180/248
[58] Field of Search .............. 180/249, 248, 247, 233; 74/710.5, 713, 714, 740, 748

[56] References Cited

U.S. PATENT DOCUMENTS 4,428,452  1/1984  Muraoka et al. .................. 180/249
4,541,503  7/1985  Akotagawa et al. .............. 180/249

Primary Examiner—John J. Love
Assistant Examiner—Donn McGiehan
Attorney, Agent, or Firm—Parkhurst & Oliff

[57] ABSTRACT

A power transfer device for a four-wheel drive vehicle comprises a first differential including a differential case arranged to be applied with drive torque from a transmission, a pinion gear rotatably mounted within the differential case, and a pair of side gears rotatably mounted within the differential case and in mesh with the pinion gear; a pair of output shafts connected to the side gears respectively for driving the front and rear road wheels; a second differential including a differential carrier formed to contain the differential case therein, a carrier rotatably mounted within the differential carrier and connected with the differential case for rotation therewith about a common axis, a sun gear integral with one of the side gears, a planetary gear rotatably supported by the carrier and in mesh with the sun gear, a ring gear integral with the inner wall of the differential carrier and in mesh with the planetary gear, the carrier being drivingly connected to an output shaft of the transmission; and a selector mechanism arranged to drivingly connect one of the output shafts or the differential carrier to the front or rear road wheels.

7 Claims, 7 Drawing Figures

POWER TRANSFER DEVICE FOR FOUR-WHEEL DRIVE VEHICLE

BACKGROUND OF THE INVENTION

1. Field of the invention

The present invention relates to a power transfer device for use in a four-wheel drive vehicle, more particularly to a power transfer device capable of controlling the split ratio of the drive torque to the front and rear road wheels in accordance with driving conditions of the vehicle.

2. Discussion of the background

In conventional power transfer devices for four-wheel drive, a differential of the bevel gear type or the planetary gear type has been adapted to transfer drive torque from a prime mover to the front and rear road wheels at a constant gear ratio. It is, however, noted that the steering stability of the vehicle is in a close relationship with the split drive torque applied to the front and rear road wheels. For this reason, it is desirable that the split ratio of the drive torque to the front and rear road wheels is controlled in accordance with road conditions and driving conditions such as frictional coefficient of the road surface, inclination of the road, acceleration of the vehicle, cornering travel of the vehicle and the like. For such control of the split ratio of the drive torque, the Japanese Patent Early Publication No. 59 - 151661 discloses a power transfer device wherein a continuously variable transmission is disposed in a front or rear wheel drive power train of the differential. In this power transfer device, the change-speed ratio of the transmission is changed in accordance with driving conditions of the vehicle to control the split ratio of the drive torque to the front and rear road wheels. It is, however, disadvantageous that the power transfer device becomes large in size and heavy due to provision of the continuously variable transmission.

SUMMARY OF THE INVENTION

It is, therefore, a primary object of the present invention to provide a compact power transfer device capable of controlling the split ratio of the drive torque to the front and rear road wheels in accordance with driving conditions of the vehicle.

According to the present invention there is provided a power transfer device for use in a four-wheel drive vehicle, wherein a first differential of the bevel gear type is associated with a second differential of the planetary gear type about a common axis to transfer drive torque from a transmission to the front and rear road wheels at a desired gear ratio. The first differential includes a differential case arranged to be applied with drive torque from the transmission, a pair of pinion gears rotatably mounted within the differential case, and a pair of side gears rotatably mounted within the differential case and in mesh with the pinion gears. A first output shaft is connected to one of the side gears for driving the front or rear road wheels, and a second output shaft is connected to the other side gear for driving the rear or front road wheels. The second differential includes a differential carrier formed to contain the differential case therein, a carrier rotatably mounted within the differential carrier and connected with the differential case for rotation therewith about a common axis, a sun gear integral with the side gear connected to the first output shaft, a plurality of planetary gears rotatably supported by the carrier and in mesh with the sun gear, a ring gear integral with the inner wall of the differential carrier and in mesh with the planetary gears. The carrier is drivingly connected to an output shaft of the transmission. A selector mechanism is arranged to drivingly connect the second output shaft or the differential carrier to the rear or front road wheels.

The power transfer device is characterized by arrangement of the sun gear integral with the side gear, the ring gear integral with the inner wall of the differential carrier, and the differential case integrally with the carrier. With such arrangement, the first and second differentials can be combined with each other in a limited space. In operation, the carrier is applied with output drive torque from the transmission, and in turn, the differential case is applied with the drive torque from the carrier to drive the side gears through the pinion gears. Thus, the first and second output shafts are applied with the drive torque at a gear ratio of the side gears. When the second output shaft is drivingly connected to the rear or front road wheels under control of the selector mechanism, the drive torque is transmitted to the front and rear road wheels at the gear ratio of the side gears. When the differential carrier is drivingly connected to the rear or front road wheels under control of the selector mechanism, the planetary gears act to transfer the drive torque from the carrier to the sun gear and the ring gear. The split drive torque to the sun gear is transmitted to the front or rear road wheels through the first output shaft, while the split drive torque to the ring gear is transmitted to the rear or front road wheels through the differential carrier. In this instance, the split ratio of the drive torque to the front and rear road wheels is determined by a gear ratio of the sun gear and the ring gear.

BRIEF DESCRIPTION OF THE DRAWINGS

Other objects, features and advantages of the present invention will become readily apparent from the following detailed description of preferred embodiments thereof when taken in connection with the accompanying drawings, in which.

DETAILED DESCRIPTION OF THE PREFERRED EMBODIMENTS

Figure 1:
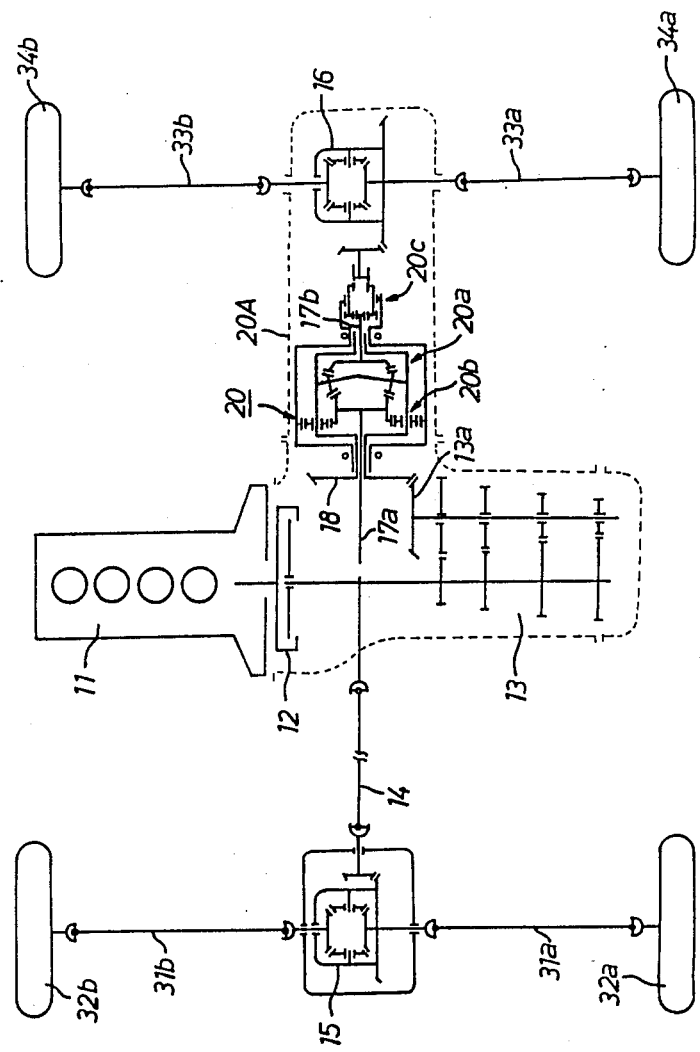
FIG. 1 is a schematic illustration of a four-wheel drive vehicle equipped with a power transfer device in accordance with the present invention.

Referring now to the drawings and particularly to FIG. 1, there is schematically illustrated a four-wheel drive vehicle of the midship type, comprising an internal combustion engine 11 mounted on a vehicle chassis (not shown) in a transverse direction, a transmission 13 drivingly connected to the engine 11 through a clutch assembly 12, and a power transfer device 20 arranged in a fore-and-aft direction of the vehicle and drivingly connected to an output bevel gear 13a of the transmission 13. The power transfer device 20 has an input bevel gear 18 in mesh with the output bevel gear 13a of transmission 13, a first output shaft 17a drivingly connected to a front propeller shaft 14 which in turn is drivingly connected to a front differential 15, and a second output shaft 17b drivingly connected through a selector mechanism 20c to a rear differential 16. The front differential 15 is arranged to drive a set of front road wheels 32a and 32b through front split axle parts 31a and 31b, and the rear differential 16 is arranged to drive a set of rear road wheels 34a and 34b through rear split axle parts 33a and 33b.

Figure 2:
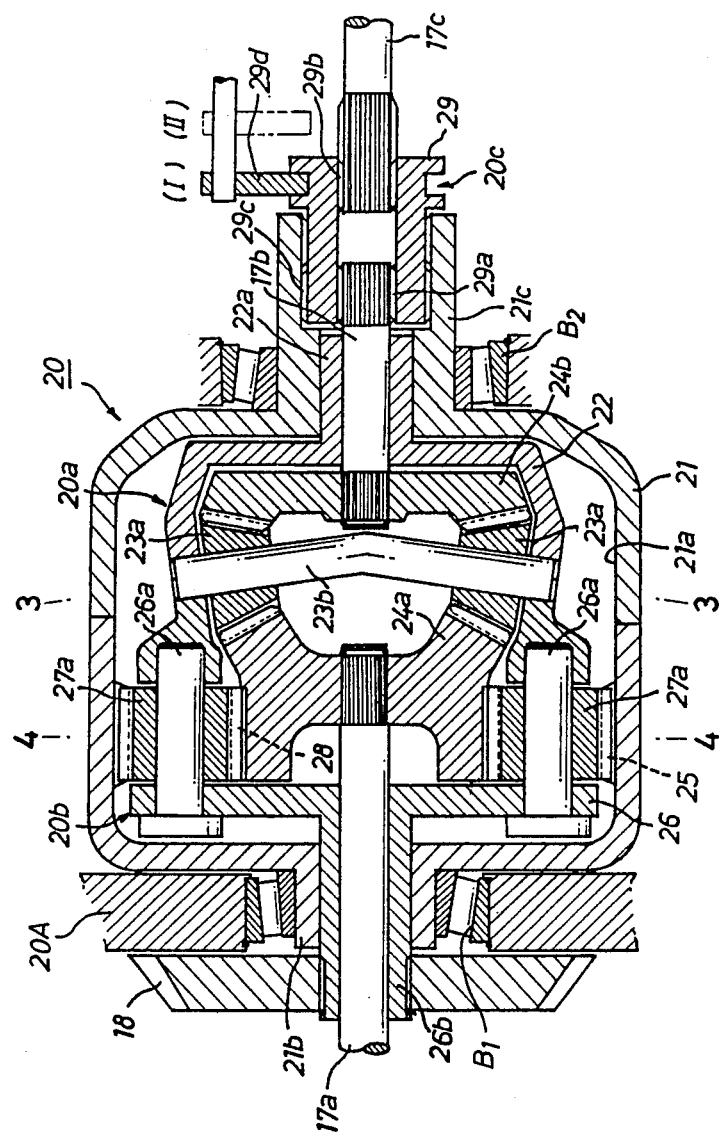
FIG. 2 is a sectioned plan view of the power transfer device shown in FIG. 1.
Figure 3:
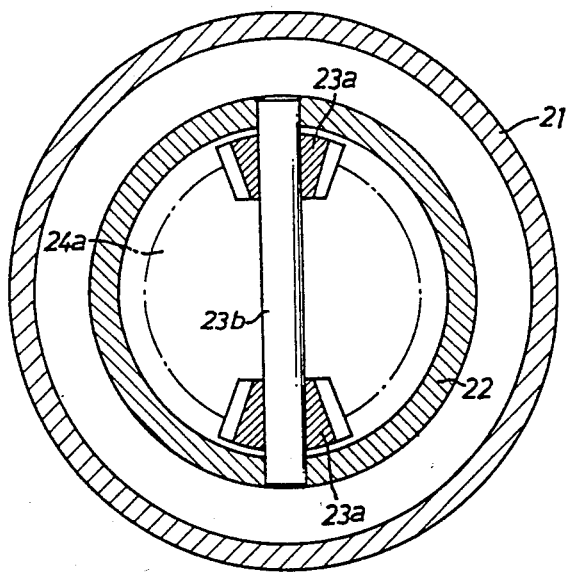
FIG. 3 illustrates a cross-section taken along lines 3—3 in FIG. 2.
Figure 4:
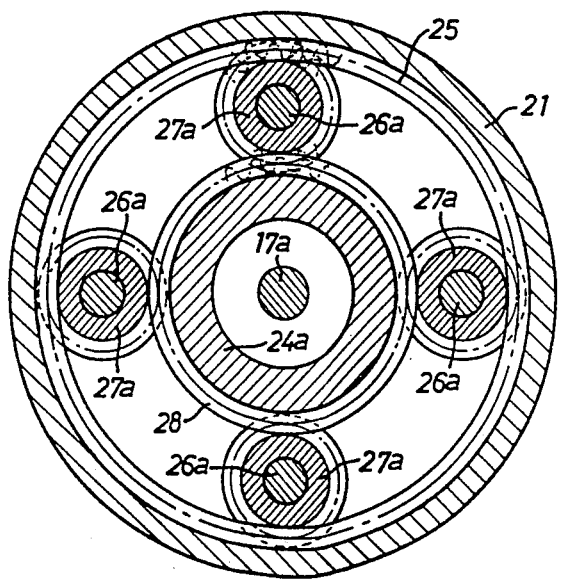
FIG. 4 illustrates a cross-section taken along lines 4—4 in FIG. 2.

As shown in FIGS. 2 to 4, the power transfer device 20 comprises a first differential 20a of the bevel gear type and a second differential 20b of the planetary gear type which are contained within a differential carrier 21 for the second differential 20b. The first differential 20a includes a differential case 22 rotatably mounted within the differential carrier 21, a pair of pinion gears 23a, and a pair of side gears 24a and 24b. The second differential 20b includes a ring gear 25 integral with the inner wall 21a of differential carrier 21, a carrier 26 rotatably mounted within the differential carrier 21, a plurality of planetary gears 27a in mesh with the ring gear 25, and a sun gear 28 integral with the side gear 24a and in mesh with the planetary gears 27a. The differential carrier 21 is contained within a trans-axle casing 20A for the transfer device 20 and has a pair of axially spaced sleeve portions 21b and 21c which are rotatably supported by a pair of axially spaced bearings $B_1$ and $B_2$ on the trans-axle casing 20A.

The differential case 22 is integrally connected with the carrier 26 by means of a plurality of circumferentially equi-spaced support pins 26a on which the planetary gears 27a are rotatably mounted, respectively. (see FIG. 4) the differential case 22 has a sleeve portion 22a rotatably coupled within the sleeve portion 21c of differential carrier 21, and the carrier 26 has a sleeve portion 26b rotatably coupled within the sleeve portion 21b of differential carrier 21. The input bevel gear 18 is splined to the outer end of sleeve portion 26b for rotation therewith. The pinion gears 23a each are rotatably mounted on a cross shaft 23b which is carried on the differential case 22. The pinion gears 23a are in mesh with the side gears 24a and 24b which are splined to the inner ends of output shafts 17a and 17b, respectively. The side gear 24a is formed smaller in diameter than the side gear 24b and has a sleeve portion formed with the sun gear 28. The first output shaft 17a extends outwardly through the sleeve portion 26b of carrier 26, while the second output shaft 17b extends outwardly through the sleeve portion 22a of differential case 22.

The selector mechanism 20c is remotely operated by the vehicle driver to selectively connect the second output shaft 17b or the differential carrier 21 to the rear differential 16 through an intermediate drive shaft 17c. The selector mechanism 20c includes a coupling sleeve 29 which is slidably mounted on the output shaft 17b and drive shaft 17c for rotation therewith. The coupling sleeve 29 has a first internally splined portion 29a slidably engaged with an externally splined portion of output shaft 17b, a second internally splined portion 29b slidably engaged with an externally splined portion of drive shaft 17c, and an externally splined portion 29c engageable with an internally splined portion of the sleeve portion 21c of differential carrier 21. A remotely operated shift fork 29d is engaged with the coupling sleeve 29 to shift it between first and second positions I and II. When retained in the first position I, the coupling sleeve 29 provides a drive connection between the output shaft 17b and the drive shaft 17c. When shifted to the second position II, the coupling sleeve 29 provides a drive connection between the differential carrier 21 and the drive shaft 17c.

In operation of the power transfer device 20, the planetary carrier 26 is applied with output drive torque from the transmission 13 through a final speed reduction gear train including the intermeshed bevel gears 13a and 18, and in turn, the differential case 22 is applied with the drive torque from the carrier 26 to drive the side gears 24a and 24b through the pinion gears 23a. Thus, the first and second output shafts 17a and 17b are applied with the drive torque at a gear ratio of the side gears 24a and 24b. Assuming that the coupling sleeve 29 of selector mechanism 20c is retained in the first position I, the split drive torque to the first output shaft 17a is transmitted to the front road wheels 32a and 32b by way of the front propeller shaft 14, front differential 15, and split axle parts 31a and 31b, while the split drive torque to the second output shaft 17b is transmitted to the rear road wheels 34a and 34b through the coupling sleeve 29, drive shaft 17c, rear differential 16, and split axle parts 33a and 33b.

When the coupling sleeve 29 is shifted to the second position II to connect the differential carrier 21 to the drive shaft 17c, the planetary gears 27a act to transfer the drive torque from the carrier 26 to the sun gear 28 and the ring gear 25. The split drive torque to the sun gear 28 is transmitted to the front road wheels 32a and 32b by way of the side gear 24a, first output shaft 17a, front propeller shaft 14, differential 15, and split axle parts 31a and 31b, while the split drive torque to the ring gear 25 is transmitted to the rear road wheels 34a and 34b through the differential carrier 21, coupling sleeve 29, drive shaft 17c, rear differential 16, and split axle parts 33a and 33b. In this instance, the split ratio of the drive torque to the front and rear road wheels is determined by a gear ratio of the ring gear 25 and sun gear 28. Consequently, the split ratio of the drive torque to the front and rear road wheels is selectively determined by operation of the selector mechanism 20c.

In the case that the gear ratio of the side gears 24a and 24b is determined to be 45:55 and that the gear ratio of the sun gear 28 and the ring gear 25 is determined to be 30:70, the split ratio of the drive torque to the front and rear road wheels can be selected in accordance with driving conditions of the vehicle as follows. When the selector mechanism 20c is operated to retain the coupling sleeve 29 in the first position I during straight travel of the vehicle, the drive torque is transmitted to the front and rear road wheels at the ratio of 45:55 to enhance acceleration performance of the vehicle. When the selector mechanism 20c is operated to shift the coupling sleeve 29 to the second position II during cornering travel of the vehicle, the drive torque is transmitted to the front and rear road wheels at the ratio of 30:70 to enhance cornering performance of the vehicle.

In the case that the gear ratio of the side gears 24a and 24b is determined to be 50:50 and that the gear ratio of the sun gear 28 and the ring gear 25 is determined to be 30:70, the split ratio of the drive torque to the front and rear road wheels can be selected in accordance with driving conditions of the vehicle as follows. When the selector mechanism 20c is operated to retain the coupling sleeve 29 in the first position I during travel of the vehicle on a slippery road such as a snowcovered or frozen road, the drive torque is transmitted to the front and rear road wheels at the ratio of 50:50 to avoid unexpected slip of the vehicle. When the selector mechanism 20c is operated to shift the coupling sleeve 29 to the second position II during travel of the vehicle on a dry asphalt road, the drive torque is transmitted to the front and rear road wheels at the ratio of 30:70 to enhance drivablity of the vehicle.

From the above description, it will be understood that the power transfer device 20 is characterized by arrangement of the sun gear 28 integral with the sleeve portion of side gear 24a, the ring gear 25 integral with the inner wall 21a of differential carrier 21, and the differential case 22 integral with the carrier 26. With such arrangement of the sun gear 28, ring gear 25 and differential case 22, the first and second differentials 20a and 20b can be combined with each other in a limited space. It is, therefore, able to provide the power transfer device 20 in a compact construction.

Figure 6:
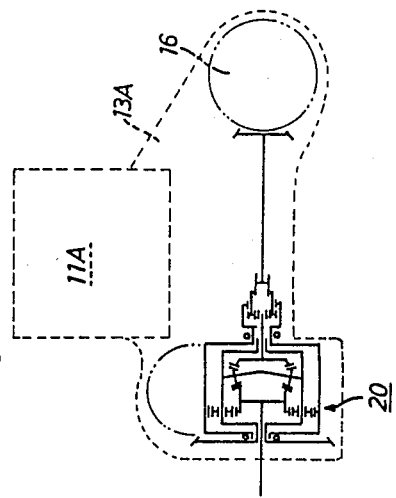
FIG. 6 is a side view showing the arrangement of the power transfer device in relation to an internal combustion engine and a rear differential shown in FIG. 5.
Figure 5:
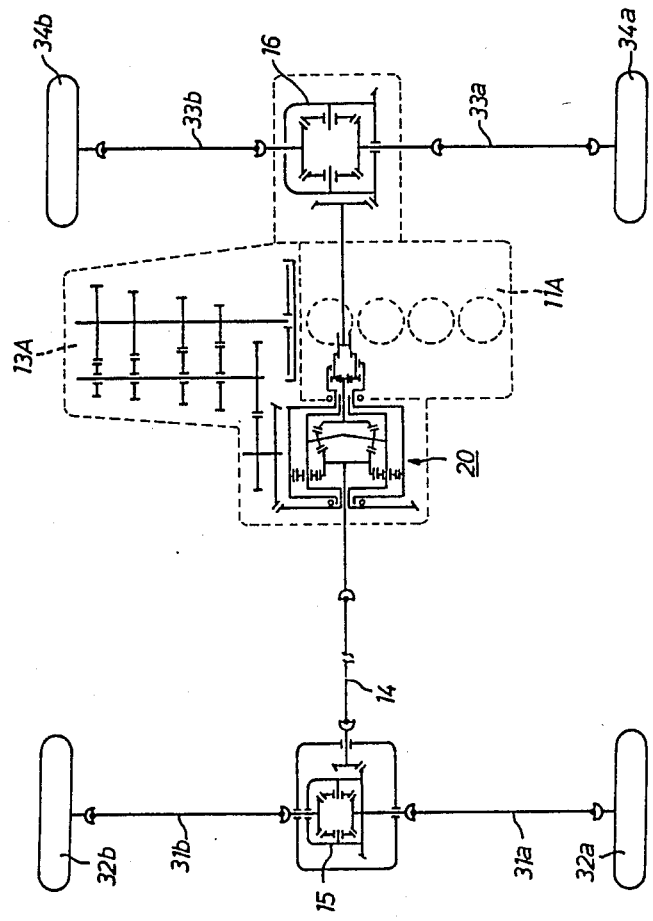
FIG. 5 is a schematic illustration of arrangement of the power transfer device in another four-wheel drive vehicle.

In FIGS. 5 and 6, there is schematically illustrated an arrangement of the power transfer device 20 in another four wheel drive vehicle of the midship type, wherein an internal combustion engine 11A is arranged at the left side of the vehicle and a transmission 13A is arrnaged at the right side of the vehicle and wherein the power transfer device 20 is drivingly connected to the transmission 13A at the front side of the engine 11A.

Figure 7:
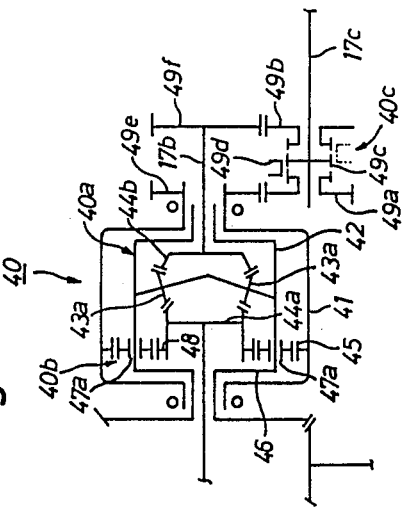
FIG. 7 is a schematic illustration of a modification of the power transfer device.

In FIG. 7, there is schematically illustrated a modification of the power transfer device 20, wherein a first differential 40a of the bevel gear type is integrally combined with a second differential 40b of the planetary gear type. The first differential 40a is mounted within a differential carrier 41 for the second differential 40b and includes a differential case 42, a pair of pinion gears 43a, and a pair of side gears 44a and 44b which correspond with the components of the first differential 20a in the power transfer device 20. The second differential 40b includes a ring gear 45, a carrier 46, a plurality of planetary gears 47a and a sun gear 48 which correspond with the components of the second differential 20b in the power transfer device 20. In the modified power transfer device 40, the intermediate drive shaft 17c is arranged in parallel with the second output shaft 17b. A selector mechanism 40c associated with the transfer device 40 includes a pair of axially spaced gears 49a and 49b rotatably mounted on the drive shaft 17c, an intermediate hub gear 49c fixed to the drive shaft 17c, and a coupling sleeve 49d slidably engaged with the hub gear 49c and shiftable between a first position where it couples the gears 49a and 49c and a second position where it couples the gears 49b and 49c. The gear 49a is permanently in mesh with a drive gear 49e integral with the differential carrier 41, and the gear 49b is permanently in mesh with a drive gear 49f integral with the output shaft 17b.

In the above modification, only the selector mechanism 40c is different in its construction and arrangement from the selector mechanism 20c in the power transfer device 20, wherein under control of the coupling sleeve 49d the same function as that of the power transfer device 20 is effected to provide the same effects or advantages. The foregoing disclosure is the best mode devised by the inventor for practicing this invention. It is apparent, however, that devices incorporating other modifications and variations to the instant invention will become obvious to one skilled in the art of four wheel drive systems. Inasmuch as the foregoing disclosure is intended to enable one skilled in the pertinent art to practice the instant invention, it should not be contstrued to be limited thereby but should be construed to include such aforementioned obvious variations and be limited only by the spirit and scope of the following claims.

The embodiments of the invention in which an exclusive property or privilege is claimed are defined as follows.

1. A power transfer device for a four-wheel drive vehicle having a transmission drivingly connected to a prime mover of the vehicle and having a set of front road wheels and a set of rear road wheels adapted to be driven from said transmission, said transfer device comprising:

a first differential of the bevel gear type including a differential case arranged to be applied with drive torque from said transmission, a pinion gear rotatably mounted within said differential case, and a pair of side gears rotatably mounted within said differential case and in mesh with said pinion gear;

a first output shaft connected to one of said side gears for driving the front or rear road wheels;

a second output shaft connected to the other side gear for driving the rear or front road wheels;

a second differential of the planetary gear type including a differential carrier formed to contain said differential case therein, a carrier rotatably mounted within said differential carrier and connected with said differential case for rotation therewith about a common axis, a sun gear integral with said side gear connected to the first output shaft, a planetary gear rotatably supported by said carrier and in mesh with said sun gear, a ring gear integral with the inner wall of said differential carrier and in mesh with said planetary gear, said carrier being drivingly connected to an outupt shaft of said transmission; and a selector mechanism arranged to selectively provide a drive connection between said second output shaft and said rear or front road wheels or a drive connection between said differential carrier and said rear or front road wheels.

2. A power transfer device as recited in claim 1, wherein one of said side gears is formed smaller in diameter than the other side gear.

3. A power transfer device as recited in claim 1, wherein said selector mechanism is arranged coaxially with said second output shaft.

4. A power transfer device as recited in claim 1, wherein said selector mechanism is arranged in parallel with said second output shaft.

5. A power transfer device as recited in claim 1, wherein said first output shaft is arranged to drive the front road wheels, and said second output shaft is arranged to drive the rear road wheels.

6. A power transfer device as recited in claim 1, wherein said carrier is integrally connected with said differential case by means of a plurality of circumferentially equi-spaced support pins, and wherein said second differential includes a plurality of planetary gears each rotatably mounted on said support pins and in mesh with said sun gear and said ring gear.

7. A power transfer device as recited in claim 1, wherein said differential carrier is arranged concentrically with said differential case, and said first and second output shafts are arranged in a fore-and-aft direction of the vehicle.

* * * * *